% $CO_2$ FROM OXIDIZED EXHAUST
AIR-FUEL RATIO AS A FUNCTION OF OXIDIZED EXHAUST

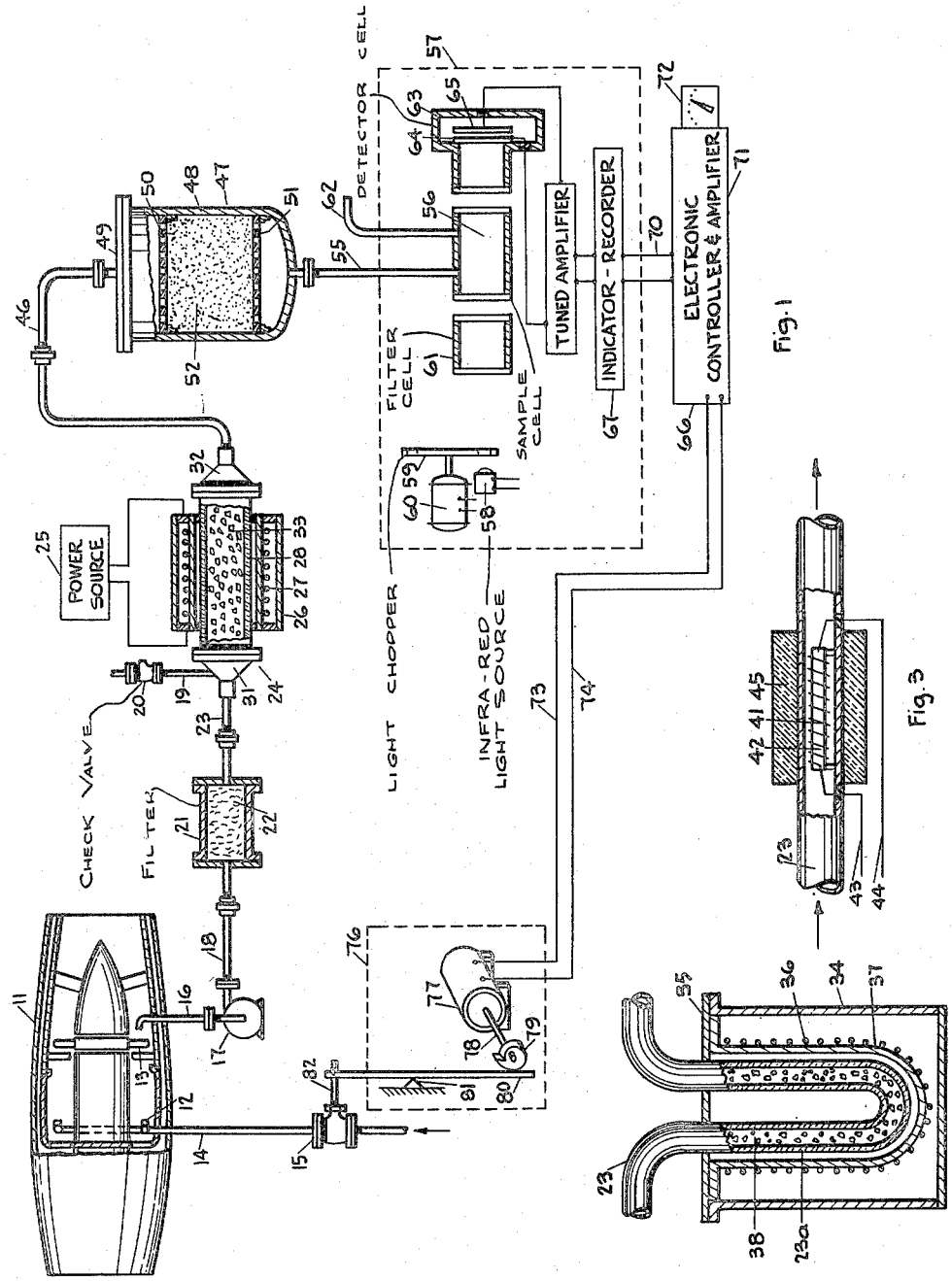

Inventors: L. M. Whitney
F. G. Bollo
By J. H. McCarthy
Their Agent

United States Patent Office 2,773,349
Patented Dec. 11, 1956

2,773,349

INFRA-RED FUEL FLOW CONTROLLER

Francis G. Bollo and Lucretia M. Whitney, Berkeley, Calif., assignors to Shell Development Company, Emeryville, Calif., a corporation of Delaware Application April 28, 1953, Serial No. 351,572

1 Claim. (Cl. 60—35.6)

This invention relates to an apparatus for controlling the fuel flow to combustion engines and pertains more particularly to an apparatus for controlling the air-fuel ratio of a jet engine as a function of the oxidized exhaust gases thereof. The term combustion engine as used herein includes all types of engines of the spark-ignition type, diesel engines, jet engines, gas turbines, etc.

Much research is being carried on with respect to improving the fuel consumption of modern aircraft engines. In order to extend the range of present-day aircraft, and in order to operate aircraft most economically, it is desirable to have aircraft provided with means for automatically controlling the engine's air-fuel ratio whereby maximum performance may be obtained with a minimum consumption of fuel.

In present-day aircraft, the air-fuel ratio of the engines is a direct function of the throttle setting which controls the amount of fuel fed to the engines. Research has shown that, in general, an excessive amount of fuel is used by a plane during flight. Under most operating conditions, the use of excessive fuel may be attributed to an error on the part of the pilot who has no means of knowing what air-fuel ratio is being used or what the optimum air-fuel ratio is under all flight conditions.

The engines of most modern aircraft are provided with barometric compensators which sense changes in the altitude of the plane so that a decreased amount of fuel is fed into the engines at higher altitudes where the air is thinner. One drawback of the present barometric compensator is that it does not recognize differences in density of the air but only pressure differences. For example, at say 30,000 feet, the air temperature one day may be −30° F. and on another day may be as much as 10° F. Thus, at the same altitude there may be a difference of 40° F. on different days which the barometric compensator would not sense. Since this temperature difference is not sensed, the engine would get less air on hot days when the air is less dense but the fuel input would stay the same. In such a case the air-fuel mixture is undesirably rich and uses up fuel at an uneconomical rate.

It is therefore a primary object of this invention to provide a system for controlling the fuel flow of aircraft engines at the most economical rate under all flight conditions.

It is also an object of this invention to provide an apparatus adapted to sense altitude and temperature changes and to maintain a fixed air-fuel ratio to aircraft engines.

A further object of this invention is to provide an automatic air-fuel ratio controller for aircraft engines which may be assembled in a light, compact unit for mounting in aircraft.

These and other objects of this invention will be understood from the following description taken with reference to the drawing, wherein:

Figure 1 is a schematic diagram illustrating an arrangement of the principal component parts of the present air-fuel ratio controller system.

Figures 2 and 3 are diagrammatic views, partly in cross-section, of other types of furnaces or combustion chambers which can be used in the present control system.

Figure 6:
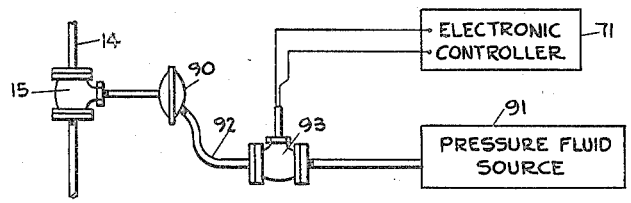
Figures 5 and 6 are diagrammatic views illustrating alternative types of electro-mechanical converters which may be used in the system of Figure 1.

The persent air-fuel ratio controller system is adapted for use with any type of combustion engine which may be either movably mounted or mounted in a stationary position. However, for purposes of illustration the present system is described hereinbelow when being used for controlling the air-fuel ratio of jet engines being used on aircraft.

Referring to Figure 1 of the drawing, a jet-type aircraft engine is diagrammatically illustrated as comprising a housing 11 in which a fuel nozzle 12 and a turbine blade or blades 13 are located. The fuel nozzle 12 is supplied, with a fuel such as kerosene, through a fuel line 14 having a valve 15 therein to control the flow. A small sample probe 16 extends through the wall of the housing 11 for obtaining a sample of exhaust gases coming from the engine. The sample probe 16 may be positioned either in front of or behind the turbine blade 13. If the sample probe is positioned in front of the turbine blade 13, there is sufficient pressure in the exhaust stream to force a sample thereof through the present controller system. If, on the other hand, the sample probe is positioned behind the turbine blade 13, as illustrated in Figure 1, the probe 16 is preferably connected to the intake of a small pump 17, for delivering the sample of exhaust gases to the fuel-flow controller system at a constant pressure.

Since solid particles are often encountered in the exhaust stream from a jet engine, the discharge line 18 from the pump 17 is preferably connected to a filter 21 for removing the solid particles from the gas stream. The filter 21 may be of any suitable type such, for example, as a simple chamber filled with cotton waste 22. Gases discharged from the filter 21 are led by means of a conduit 23 to a furnace 24. An air inlet line 19 closed by a check valve 20 may be provided as one possible source of oxygen in furnaces which are employed in systems of certain internal combustion engines where, with rich air-fuel mixtures, there is insufficient oxygen for complete combustion.

The furnace 24 may be of any desired type but is preferably an electrical furnace powered from a suitable power source 25. The furnace shown in Figure 1 comprises an elongated cylindrical housing 26 having a heating element 27 wound on the inner wall of said housing. Positioned axially within the housing 26 and its heating element 27 is an elongated quartz tube 28 closed at both ends by suitable closure means 31 and 32 and, if desired, may be filled with quartz chips 33. Heating element 27 should be capable of heating the furnace to a temperature from about 500 to 1000° C. or more. At high temperatures it has been found desirable to replace the quartz tube 28 with one made of a nickel-chromium alloy. Additionally, the tube 28 need not be filled with quartz chips.

Furnaces of many types may be used. Another type is shown in Figure 2 as comprising a housing 34 closed by a cover 35 and containing a heating element 36 wound around a cup-shaped element 37 forming a well in the housing. A portion of the gas conduit 23 coming from the filter 21 is formed in the shape of a U and positioned in the housing 34. The U shaped portion 23a of the conduit 23 is filled with platinized silica gel 38. Thus, the furnace of Figure 2 is a small crucible furnace containing a portion of the flow conduit 23 filled with platinized silica gel.

Another type of furnace is shown in Figure 3 as comprising a platinum wire 41 wound upon a quartz tube 42 which acts as a support mandrel. If desired, the wire 41 may be made of other metals or alloys which may withstand high temperatures, such as nickel alloy wires containing 80% nickel and 20% chromium. The wire-wrapped tube 42 is mounted axially within the flow conduit 23 of the system shown in Figure 1. Current is supplied to the heating tube 42 through suitable leads 43 and 44. If desired, the winding of wire 41 on the tube 42 may be tapered so that more heat is delivered to the cold gas as it enters the tube on the upstream end thereof. Preferably, the heated portion of the tube 23 is covered with suitable insulation material 45.

Referring to Figure 1, the furnace 24 is connected by means of a conduit 46 to a drying chamber or water-adsorbing unit 47. This unit for removing moisture from the gas may comprise a housing 48 having a removable cover 49. The housing 48 may be provided with a pair of horizontal screens 50 and 51 having the space therebetween filled with a granular drying agent such as calcium chloride, calcium sulphate, alumina or bauxite.

The discharge conduit 55 from the drying unit 47 is connected to the sample or absorption cell 56 of an infra-red gas analyzer which is diagrammatically represented in Figure 1 as contained within the broken lines 57. While any suitable type of infra-red gas analyzer may be employed, the one illustrated is described in detail in a copending patent application Serial No. 319,968 filed November 12, 1952, by V. N. Smith and G. C. Eltenton, now Patent No. 2,674,696, issued April 6, 1954, entitled "Infra-Red Gas Analyzer." The particular infra-red analyzer illustrated comprises an infra-red source 58, a light chopper 59 driven by motor 60, a filter cell 61, a sample cell 56 with inlet and outlet conduits 55 and 62 respectively, and a detector cell 63. The detector cell 63 is provided with a diaphragm 64 and a condenser plate 65 which are electrically connected to a tuned amplifier 67 and a recorder 66.

The infra-red analyzer 57 is electrically connected through leads 70 with an electronic positioning controller and amplifier 71 which may comprise any suitable controller device with derivative, proportional and integral control functions. The controller 71 is also provided with a selector switch 72 which may be manually set at a value corresponding to the air-fuel ratio of the engine at which it is desired to operate. The proportional control characteristic of the controller 71 causes the controller to transmit a signal which is proportional to the deviation between the air-fuel ratio which has been set on the selector 72 and the carbon dioxide content of the exhaust gas which has been analyzed by the infra-red apparatus 57. The integral control functions of the controller 71 compensate for system non-linearities while the derivative control function acts to stabilize the dynamic characteristics of the system.

The controller 71 is electrically connected by means of leads 73 and 74 to a suitable electro-mechanical converter represented as being shown in the box formed by broken lines 76. For purposes of illustration, the electro-mechanical converter 76 is shown as comprising a two-phase reversible motor 77 whose shaft 78 is provided with a cam 79. Rotation of the cam 79 alters the position of linkage member 80 fulcrumed or pivoted at 81. The other end of the linkage member 80 is pivotally connected to the stem 82 of valve 15. It is realized that, alternatively, the signal obtained from the controller 71 may also be employed to operate control valves 15 of the electrically, hydraulically or pneumatically actuated types.

Figure 4:
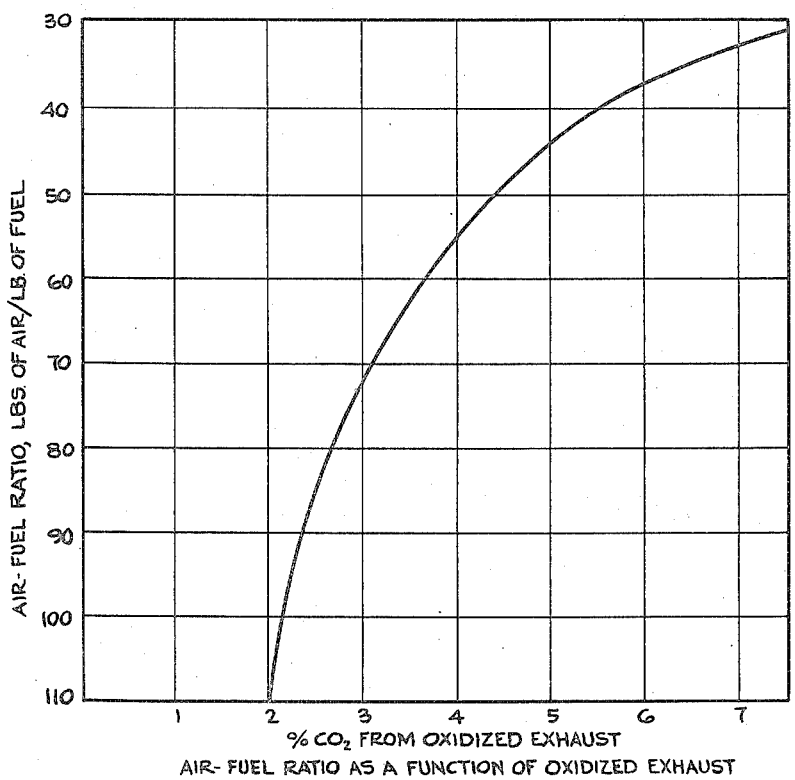
Figure 4 is a curve showing the air-fuel ratio of an engine as a function of the percent of carbon dioxide in the oxidized exhaust gases.

Referring to Figure 4 of the drawing, it will be seen that, for any fuel, the air-fuel ratio in pounds of air per pounds of fuel may be plotted against the percentage of carbon dioxide in the exhaust gases coming from the engine using that fuel. Thus, if an aircraft engine is operated on one type of fuel with an air-fuel ratio of 85 for optimum economy of fuel under certain flight conditions, there will be 2½% of carbon dioxide in the exhaust gases if these gases are put through a furnace to oxidize any components which were not oxidized during the normal burning of the fuel within the engine. The present fuel flow controller system is based on the principle of controlling the air-fuel ratio of an engine by measuring the carbon dioxide content of the oxidized exhaust gases, and converting this measurement to an electrical signal which is then employed to actuate the flow-controlling valve in the fuel line 14 to engine whereby a greater or lesser amount of fuel may be sent to the engine to maintain a constant air-fuel ratio.

In operation, a portion of the exhaust gases coming from the airplane engine 11 are collected by the tip of the probe 16 within the housing 11. If the probe 16 is directly in the combustor chamber of a jet engine the pressure therein is normally four times that of the ambient pressure and no pump 17 is needed. If, however, the probe is positioned behind the turbine blade 13 as shown in Figure 1, the constant pressure pump 17 pumps the sample collected by the probe 16 through conduit 18 and into filter chamber 21 where the solid particles are removed from the gas. The gas is then forced through conduit 23 into the furnace 24 where any carbon monoxide, or any saturated or unsaturated hydrocarbons, are oxidized to carbon dioxide. The minimum temperature of the furnace should be about 500° C. and the contact time of the gas in the furnace should be sufficient to burn all the products to carbon dioxide and water. Since the exhaust gases of rich mixtures of fuel may contain some methane, the furnace 24 for use with these fuels should be heated to about 1000° C. The wet exhaust gases coming from the furnace are piped through conduit 46 into the drying chamber 47 where the moisture is removed. The dried gases are then pumped from the drying chamber through conduit 55 into the infra-red apparatus where the sample of gas is continuously analyzed for the carbon dioxide content therein.

A signal proportional to the amount of carbon dioxide in the exhaust gases is transmitted from the infra-red gas analyzer 57 through leads 70 into the electronic controller 71. The desired air-fuel ratio at which the engine is to be operated is previously set on the selector dial 72 of the controller 71. Whenever the air-fuel ratio of the engine varies it will be noted by the controller from the change in the signal from the infra-red gas analyzer 57. Any change in signal coming to the electronic controller 71 will cause the controller to transmit a signal to the reversible motor 77 which in turn causes the cam 79 to rotate which in turn actuates lever arm 80 causing the valve stem and valve 15 in the fuel flow line 14 to be moved to a more open or closed position, depending on the signal necessary to correct for the condition noted.

Thus, for example, if an aircraft, using fuel in the engines with characteristics similar to those shown in Figure 4, is cruising with an air-fuel ratio of 71 corresponding to 3 percent of $CO_2$, the 71 air-fuel ratio would be set on selector switch 72 of the controller 71 which would control valve 15 to admit sufficient gas to the engine to operate at that ratio. If while cruising and using the air-fuel ratio of 71 the plane suddenly enters a less dense air formation, the air-fuel ratio is suddenly decreased to, say, 62. In such an event the exhaust gases from this mixture going through the infra-red analyzer 57 would show that the carbon dioxide content of the exhaust gases has been increased from 3% to 3½%. This deviation of ½% in the carbon dioxide content of the exhaust gases would be sensed by the change in the signal from the analyzer 57 to the controller 71. The controller 71 would then transmit a signal to the valve positioner 76 which would actuate motor 77 to close the valve 15 in the fuel line 14 slightly allowing less fuel to flow to the engine and thus increasing the air-fuel ratio to its former desired values. Thus, the present control system provides a simple effective means of continuously controlling the air-fuel ratio of an engine at a constant value irrespective of the flight conditions encountered.

It is realized that the present system may also be used on engines during their manufacture or repair for test purposes. In such a case the performance of the engine could be checked by the recorder 66 carried by the infra-red gas analyzer 57.

Figure 5:
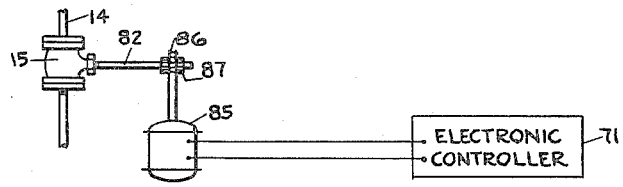

Instead of employing the signal from the electronic controller 71 to actuate the electro-mechanical converter 76 which in turn operates the valve 15 as shown in Figure 1, the signal from the controller 71 may be used to energize a two-phase reversible motor 85 as shown in Figure 5 of the drawing. A worm 86 is mounted on the shaft of the motor 85 so that it meshes with a worm gear 87 carried on the stem 82 of valve 15 in the fuel flow line 14. The valve 15 could thus be opened and closed to a greater or lesser degree on rotation of the motor in one direction or the other.

In some cases it may be desirable to employ a pressure-actuated diaphragm motor 90 which is mounted on valve 15 of the fuel flow line 14. The diaphragm motor 90 is exposed to a pressure fluid source 91 through conduit 92. An electrically-controlled valve 93, such, for example, as a solenoid valve, in the conduit 92 is actuated by the varying signal from the electronic controller 71. Thus, the setting of valve 93 and valve 15 vary in response to the signal from the electronic controller 71 in a manner which is proportional to the air-fuel ratio of the engine.

We claim as our invention:

An apparatus for automatically regulating the fuel flow to an engine independent of the amount of air supplied thereto for controlling and maintaining the air-fuel ratio in said engine at a constant selected value, said apparatus comprising a jet engine, a fuel line to said engine, a fuel flow control valve in said line, conduit means for obtaining a portion of the exhaust gases from said engine, filter means in communication with said conduit means for removing solids from said exhaust gases, high temperature furnace means having a minimum operative temperature of 500° C. in communication with said filter for burning the unburned components of said gases, valved inlet means in communication with said furnace means for admitting oxygen thereinto to oxidize completely said exhaust gases to carbon dioxide, a drying chamber in communication with said furnace for removing moisture from said gases, an infra-red gas analyzer adapted to analyze continuously the carbon dioxide content of the completely oxidized exhaust gases and to transmit an electrical signal proportional thereto, conduit means between said drying chamber and said analyzer for continuously circulating the dried gases through said analyzer, an electronic controller electrically connected to said analyzer, selector means on said controller adapted to be set at the air-fuel ratio at which the engine is to operate, valve-positioning means electrically connected to said controller and mechanically connected to said fuel flow control valve for varying the setting of said valve in response to variations in the signal from said controller.

References Cited in the file of this patent
UNITED STATES PATENTS

| Number | Name | Date |
|---|---|---|
| 1,564,553 | Gibson | Dec. 8, 1925 |
| 1,900,884 | Lusby | Mar. 7, 1933 |
| 1,952,005 | Willenborg | Mar. 20, 1934 |
| 2,248,090 | Kittler | July 8, 1941 |
| 2,369,698 | Willenborg | Feb. 20, 1945 |
| 2,462,995 | Ritzmann | Mar. 1, 1949 |
| 2,545,162 | Muly et al. | Mar. 13, 1951 |